March 3, 1942.   A. G. BADE   2,275,243
VARIABLE SPEED TRANSMISSION
Filed March 14, 1941
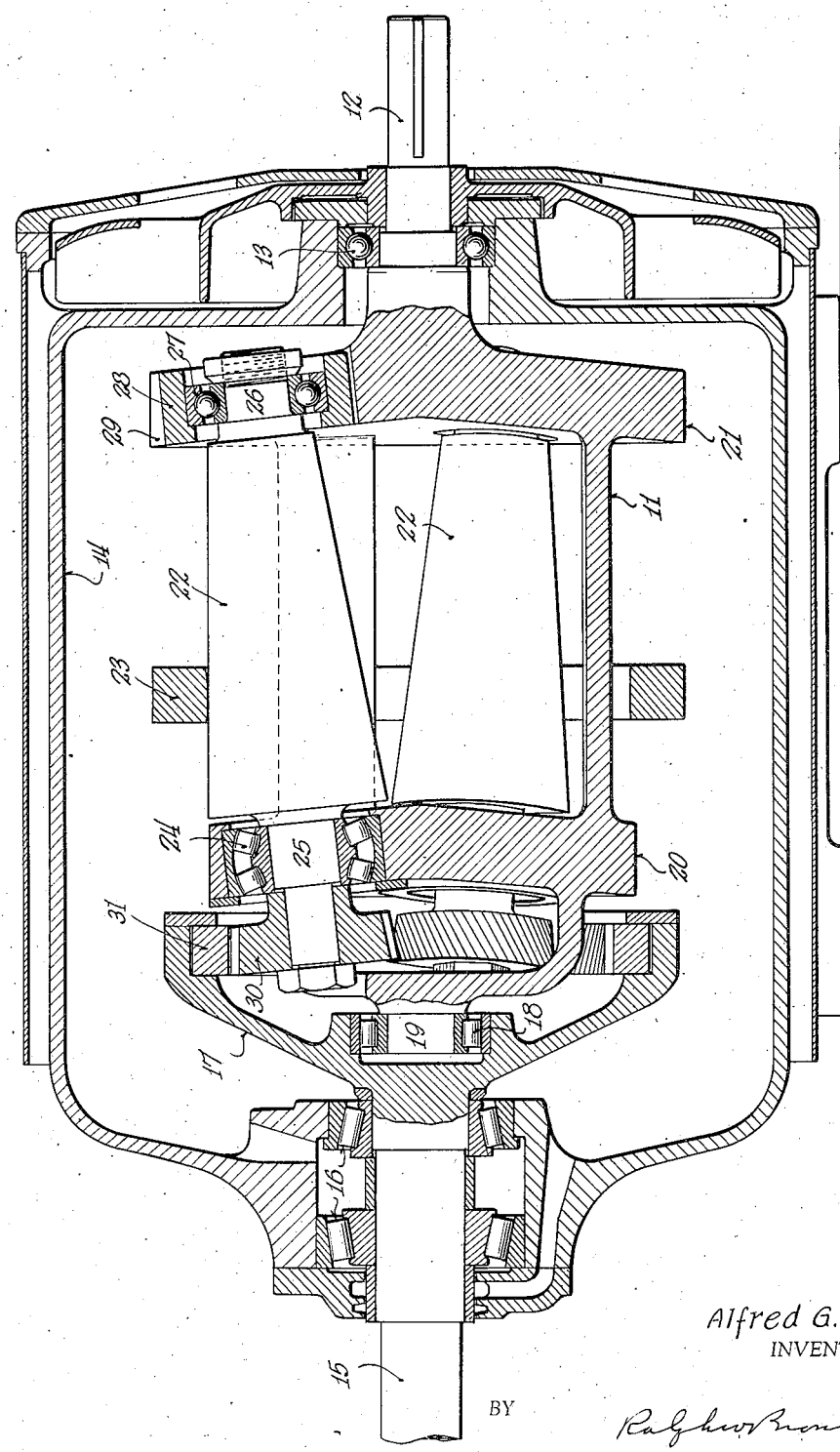
Alfred G. Bade
INVENTOR.
BY Ralph W Brown
ATTORNEY.

Patented Mar. 3, 1942

2,275,243

UNITED STATES PATENT OFFICE 2,275,243

VARIABLE SPEED TRANSMISSION

Alfred G. Bade, Wauwatosa, Wis., assignor to The Falk Corporation, Milwaukee, Wis., a corporation of Wisconsin Application March 14, 1941, Serial No. 383,257

2 Claims. (Cl. 74—281)

This invention relates to variable speed transmissions of the type involving a plurality of inclined planetary rollers and an encircling ring adjustable lengthwise thereof to control their motion.

A variable speed transmission of this type is disclosed in the prior patent of myself and Walter P. Schmitter, No. 2,203,637, dated June 4, 1940. A more specific discussion of this prior transmission will be found in connection with the detailed description below of a transmission involving the present invention.

The principal object of the present invention is to arrange the various elements of a variable speed transmission of this type so as to utilize to best advantage the gyroscopic forces set up in the rotating planetary rollers.

More specifically, the present invention aims to utilize such gyroscopic forces to induce pressure contact between the planetary rollers and the encircling control ring, while reducing the load upon the bearings of the rollers.

Another object is to correlate the gyrostatic action with various other forces and thrusts acting upon the planetary rollers so as to increase the contact pressures between rollers and control ring while minimizing the load on the bearings of the rollers.

Other more specific objects and advantages will appear from the following description of an illustrative embodiment of the present invention.

In the single figure of the accompanying drawing there is shown a longitudinal sectional view of a variable speed transmission built in accordance with the present invention.

The variable speed transmission shown in the drawing is generally similar to that disclosed in the application identified above. It includes a rotary carrier 11, provided at one end with an integral drive shaft 12 which, being journalled in a bearing 13 in a casing 14, serves to mount the rotary carrier at that end for rotation with respect to the casing. At the opposite end of the casing a driven shaft 15 is likewise journalled in the casing 14 in bearings 16, and carries a spider 17 formed integrally therewith. Journalled in a bearing 18 for rotation with respect to the spider 17 is a trunnion 19 formed on the end of the rotary carrier 11, so that the carrier and the spider 17 are both supported in the casing 14 for rotation independently of each other.

The rotary carrier 11 is formed with end heads 20 and 21 in which a group of conical rollers 22 are mounted for rotation about their own axes as well as in planetary fashion about the central axis of the carrier. The axes of the conical rollers are inclined, so that their outer surfaces are substantially parallel, and the entire group of rollers roll against an encircling control ring 23, mounted for movement lengthwise of the rollers to control their planetary action (the lengthwise shifting of the ring being effected by means well known in the art and not shown in the drawing).

In this instance each of the rollers 22 has a pivotal mounting in the carrier 11, including a spherical bearing 24 for a trunnion 25 at the large end of the roller. A trunnion 26 at the small end of each roller is mounted by means of a bearing 27 in a slide block 28, guided in a radial slot 29 in the end head 21, in a manner similar to the disclosure in the patent hereinabove identified so that the block and the end of the roller which it carries are constrained to rotate with the carrier with the axis of each roller maintained within a radial plane of the carrier, but the small end of each roller is free to outwardly move in a manner to produce pressure contact of the roller 22 against the control ring 23.

Motion of the rollers is transmitted to the driven shaft 15 through pinions 30 affixed to the end of each of the rollers 22. These pinions all engage an internally toothed ring gear 31 floatably mounted in the spider 17 affixed to the driven shaft 15.

It is important to note that the rollers are rockably mounted in such manner as to permit the smaller ends thereof to swing outwardly. When so arranged, the gyroscopic forces resulting from high speed rotation of the rollers about their individual axes may be utilized to best advantage. It has been found that, during rotation of the rollers with the carrier, these gyroscopic forces produce a force couple tending to urge the small free ends of the rollers outward and the radially fixed large ends of the rollers inward.

With the rollers so mounted, the gyroscopic forces cooperate to best advantage with other existing forces, such as the centrifugal forces induced by rotation of the rollers with the carrier. The centrifugal forces of course urge the rollers outward at all points in their length, producing contact pressures between the rollers and ring (a desirable result) and also producing outward radial thrusts on the several spherical bearings (an undesirable result). Since in this instance the gyroscopic forces urge the small free ends of the rollers outward, they assist the centrifugal forces in producing the desired contact pressures between the rollers and ring, and since they urge the large fulcrumed ends of the rollers inward, they produce an inward thrust on the spherical bearings, thus reducing the load imposed thereon by the centrifugal forces.

The advantages thus gained by mounting the rollers in the manner above described will be appreciated when one compares that arrangement and effect with that of the patent above identified. In the device of said patent the gyroscopic forces tend to swing the large free ends of the rollers inward in a manner to reduce the contact pressures between the rollers and ring and thus appose the desirable pressure inducing function of the centrifugal forces, while they also urge the fulcrumed small ends of the rollers outward and thus increase the undesirable load imposed upon the spherical bearings by the centrifugal forces.

It will be further noted that in the transmission herein disclosed, the normal separating reaction between the ring gear 31 and the several pinions 30 induces an inward thrust on the spherical bearing 24, which further counteracts the outward thrust normally resulting from centrifugal force and, through the pivotal action of the bearings 24 this separating reaction further urges the rollers against the control ring.

It will of course be understood that the transmission herein disclosed may, if desired, be equipped with an additional means, such for instance, as that shown in the patent above identified, for inducing pressure contact between the rollers and ring.

Various changes may be made in the embodiment of the invention hereinabove specifically described without departing from or sacrificing the advantages of the invention as defined in the appended claims.

I claim:

1. In a variable speed transmission the combination of a rotary carrier, a plurality of conical planet rollers rotatable with and with respect to said carrier and inclined with respect to the axis thereof, a control ring encircling and contacting said rollers and movable lengthwise thereof to regulate their motion, a radially fixed support for the large end of each roller, and means for maintaining the axis of each roller in a radial plane of said carrier while permitting the small end thereof to swing outwardly relative to said carrier, whereby gyroscopic forces acting on said rollers urge the same against said ring.

2. In a variable speed transmission the combination of a rotary carrier, a plurality of conical planet rollers rotatable with and with respect to said carrier and inclined with respect to the axis thereof, a control ring encircling and contacting said rollers and movable lengthwise thereof to regulate their planetary motion, means in said carrier providing radially fixed rockable supports for said rollers adjacent their large ends, and a radial guide for the small end of each roller permitting the same to swing radially of said carrier, whereby said rollers are urged against said ring by centrifugal and gyroscopic forces acting on said rollers.

ALFRED G. BADE.